(12) United States Patent
Kimura

(10) Patent No.: US 7,113,308 B2
(45) Date of Patent: Sep. 26, 2006

(54) METHOD AND APPARATUS FOR RECORDING IMAGES BASED ON MEASURED VIBRATION

(75) Inventor: Yoichi Kimura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 990 days.

(21) Appl. No.: 10/093,372

(22) Filed: Mar. 11, 2002

(65) Prior Publication Data

US 2002/0140994 A1 Oct. 3, 2002

(30) Foreign Application Priority Data

Mar. 28, 2001 (JP) ............................ 2001-094186

(51) Int. Cl.
*G06F 15/00* (2006.01)
*H04N 1/04* (2006.01)
*G03F 3/08* (2006.01)

(52) U.S. Cl. ........................ 358/1.9; 358/474; 358/521

(58) Field of Classification Search ................ 358/1.9, 358/521, 474; 399/8; 345/740, 719, 473, 345/474, 475, 714; 396/59, 333, 429; 348/64

See application file for complete search history.

(56) References Cited

U.S. PATENT DOCUMENTS

2002/0025172 A1* 2/2002 Tsuda et al. .................. 399/8

* cited by examiner

*Primary Examiner*—Kimberly Williams
*Assistant Examiner*—Charlotte M. Baker
(74) *Attorney, Agent, or Firm*—Sughrue Mion, PLLC

(57) ABSTRACT

An image recording device includes a sub-scanning/conveyance device for sub-scanning and conveying an image recording material. An acceleration pickup for measuring acceleration of the sub-scanning/conveyance device is mounted to the sub-scanning/conveyance device and connected to a control section. When the acceleration pickup detects acceleration equal to or greater than a predetermined value, an alarm is turned on via a bus to signal a frame number of the image recording material exposed when vibration equal to or greater than a predetermined value has occurred. Image data of the corresponding image number detected by a hole sensor is inputted from an image processor to an image data storage device and stored therein. When a predetermined exposure ends, the stored image data is transmitted from the image data storage device to a light beam scanning device, and the image recording material is re-exposed in accordance with the image data.

17 Claims, 7 Drawing Sheets

METHOD AND APPARATUS FOR RECORDING IMAGES BASED ON MEASURED VIBRATION

BACKGROUND OF THE INVENTION

1. Field of the Invention

The present invention relates to an image recording device that exposes an image recording material to form a latent image.

2. Description of the Related Art

In recent years, printing devices that utilize digital exposure, namely, digital photoprinters, have been made practicable. In the digital photoprinters, an image recorded on a photographic film is read photoelectrically, the read image is converted into a digital signal and the digital signal is subjected to various image processing whereby image data for recording is generated. An image recording material (photosensitive material) is scan-exposed with light beams modulated on the basis of the image data to form an image (latent image). The image recording material is developed and processed, and a print (photograph) is outputted.

In the digital photoprinter, gradation correction is carried out by processing the read image (digital signal) to determine conditions for the image recording material. Thus, editing of a print image, such as synthesizing many images or dividing images, and various types of image processing, including color/density adjustment and edge enhancement, can be performed freely. Namely, a print that has been image-processed freely in accordance with the application to which it is to be put can be outputted.

Further, in the digital photoprinter, image data of the printed image can be supplied to a computer or the equivalent or can be stored in a storage medium, such as a floppy disk. Moreover, the digital photoprinter can output a print having superior resolution, color/density reproducibility and image quality in comparison to a print obtained by conventional direct exposure.

The digital photoprinter basically comprises an input device that includes a scanner (image reading device) and an image processing device, and an output device that includes a printing device (image recording device) and a developing device.

The scanner photoelectrically reads light transmitted through an image photographed on a film by an image sensor, e.g., a CCD sensor, and transmits image data of the film (image data signal) to the image processing device. In the image processing device, predetermined image processing is performed for the image data and output image data for image recording (exposure conditions) is transmitted to the printing device.

When the printing device utilizes scan-exposure with a light beam, a light beam modulated on the basis of the supplied image data is deflected in a main scanning direction and a photosensitive material is scanned and conveyed in a sub-scanning direction perpendicular to the main scanning direction. In this way, the photosensitive material is scanned and exposed with a light beam, whereby a latent image is formed and a back print is recorded. In the developing device, the exposed photosensitive material is subjected to a predetermined development processing, whereby a print in which the image photographed on the film has been reproduced is formed.

In a printer, regardless of whether the printer is a digital photoprinter or an analog photoprinter, an elongated photosensitive material that is wound in a roll is used. The photosensitive material is pulled out from a magazine for accommodating the photosensitive material, exposed continuously without being cut and then developed and dried. Thereafter, the photosensitive material is cut into prints to make finished prints.

If the printing device is made to vibrate greater than a permissible range due to an external force (for example, a force impacting the device or an earthquake) acting on the printing device, the image of the image frame of the photosensitive material that was exposed during the vibration becomes unsatisfactory because of image unevenness.

Because the photosensitive material is continuously exposed with light without being cut, it is impossible to identify the image frame of the photosensitive material that was exposed when the vibration occurred. Accordingly, after finished prints are formed, images are checked to identify the image frame number that was unsatisfactory. The image of the corresponding image frame number is read again by the image sensor and the photosensitive material is re-exposed with the light obtained from the read data.

As described above, it is impossible to objectively determine whether or not the printing device was affected by the external force until images are checked. Further, the image corresponding to the image frame number that was rendered unsatisfactory as a result of the external force can only be identified by checking the images on the finished prints, which is inconvenient.

SUMMARY OF THE INVENTION

The present invention was devised in view of the above-described facts. It is an object of the present invention to provide an image recording device that can identify, without having to check finished images, an image frame number of an image recording medium that is disposed in the image recording device and has been vibrated due to an external force acting upon the image recording device and causing image unevenness in the image of the image frame number exposed at the time the external force acted upon the image recording device, and that can re-expose an image recording material based on image data corresponding to the image frame number.

In accordance with a first aspect of an image recording device of the present invention, the image recording device comprises an exposure mechanism for exposing an image recording material at an exposure section to form a latent image on the image recording material, a vibration measuring device, disposed in a vicinity of the exposure mechanism, for measuring vibration of the exposure section and an information device for notifying an operator of an image frame number of said image recording material exposed during the vibration when a value measured by the vibration measuring device is equal to or greater than a predetermined value.

In accordance with a second aspect of the image recording device of the present invention, the image recording device comprises an exposure mechanism for main-scanning an image recording material, which is conveyed in a sub-scanning direction, by light beams, which are modulated on the basis of image data, to form a latent image on the image recording material, a vibration measuring device, disposed in a vicinity of the exposure mechanism, for measuring vibration of an exposure section and an information device for notifying an operator of an image frame number of the image recording material exposed during the vibration when a value measured by the vibration measuring device is equal to or greater than a predetermined value.

In accordance with the first and the second aspects of the image recording device relating to the present invention, the number of the image frame of the image recording material exposed when vibration of a predetermined value or greater has occurred is informed by an alarm or a display, and image unevenness is checked for the corresponding image frame number. Thus, a check operation becomes easy.

In accordance with a third aspect of an image recording device of the present invention, an exposure mechanism for exposing an image recording material at an exposure section to form a latent image on said image recording material, a vibration measuring device, disposed in a vicinity of the exposure mechanism, for measuring vibration of the exposure section, a storage device for storing image data of an image frame number of the image recording material exposed by the exposure mechanism when a value measured by the vibration measuring device is equal to or greater than a predetermined value; and a control device for controlling the exposure mechanism to expose the image recording material by using the image data stored in the storage device to form a latent image of the image data on the image recording material.

As described above, the image data of the image frame number having an unsatisfactory image quality is stored in the storage device, and at the time of re-exposure, the image data is read from the storage device, which leads to labor-saving.

In the image recording device of the present invention, the vibration measuring device is preferably provided so as to be connected to the image recording material conveying device in the exposure mechanism.

In the image recording device of the present invention, the vibration measuring device is an acceleration detector which measures acceleration in at least one direction of a direction in which the image recording material is conveyed, a direction orthogonal to the direction in which the image recording material is conveyed and a direction vertical to the surface of the image recording material.

In the image recording device of the present invention, when the value measured by the vibration measuring device is equal to or greater than a predetermined value for a predetermined period of time or longer, conveyance of the image recording material is preferably stopped.

In the image recording device of the present invention, when the vibration continues, the conveyance of the image recording material is stopped. Thus, a waste of the image recording material can be avoided.

DESCRIPTION OF THE PREFERRED EMBODIMENTS

Firstly, description will be given of the overall structure of an image recording device according to an embodiment of the present invention.

Image Recording Device

Figure 1:
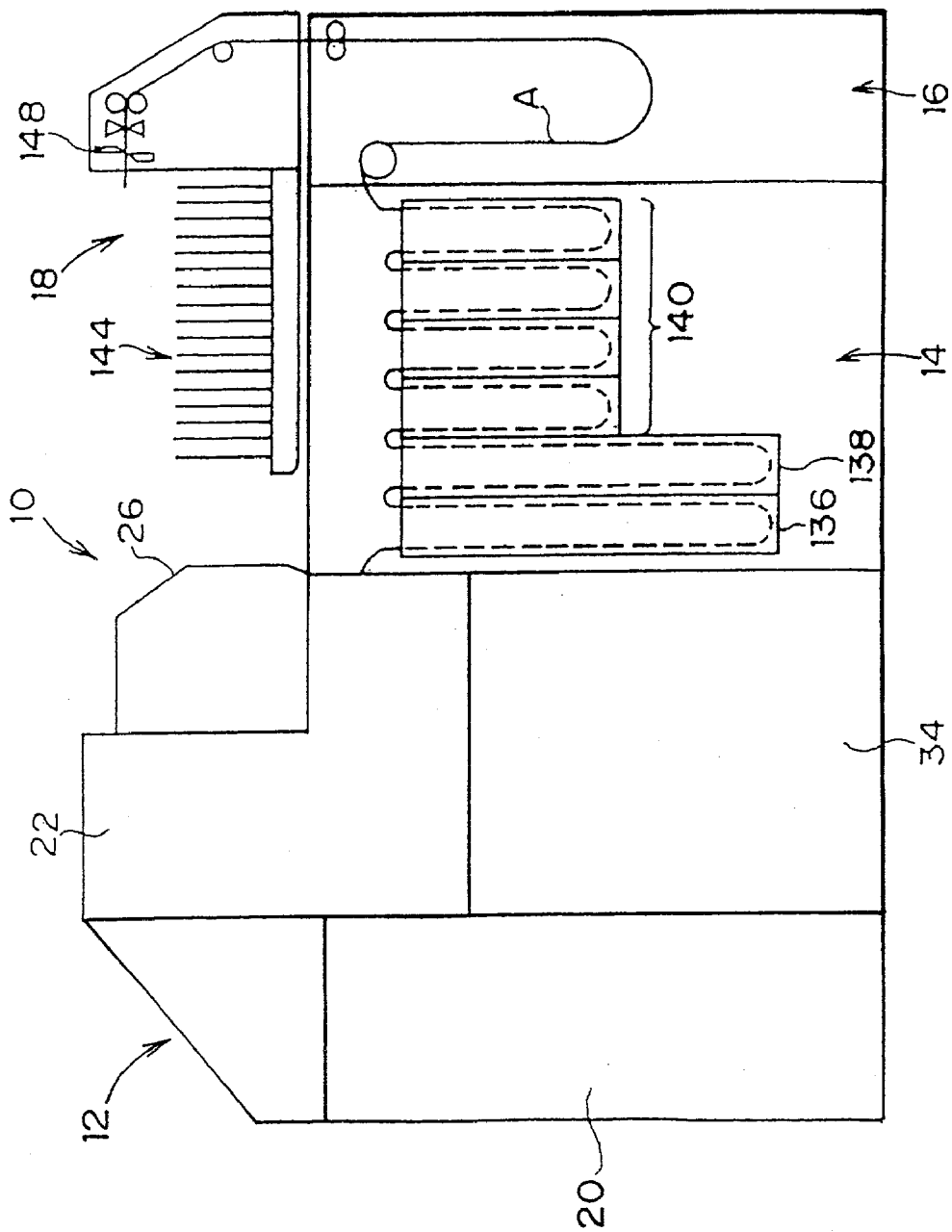
FIG. 1 is an explanatory view of an image recording device relating to the present invention.
Figure 2:
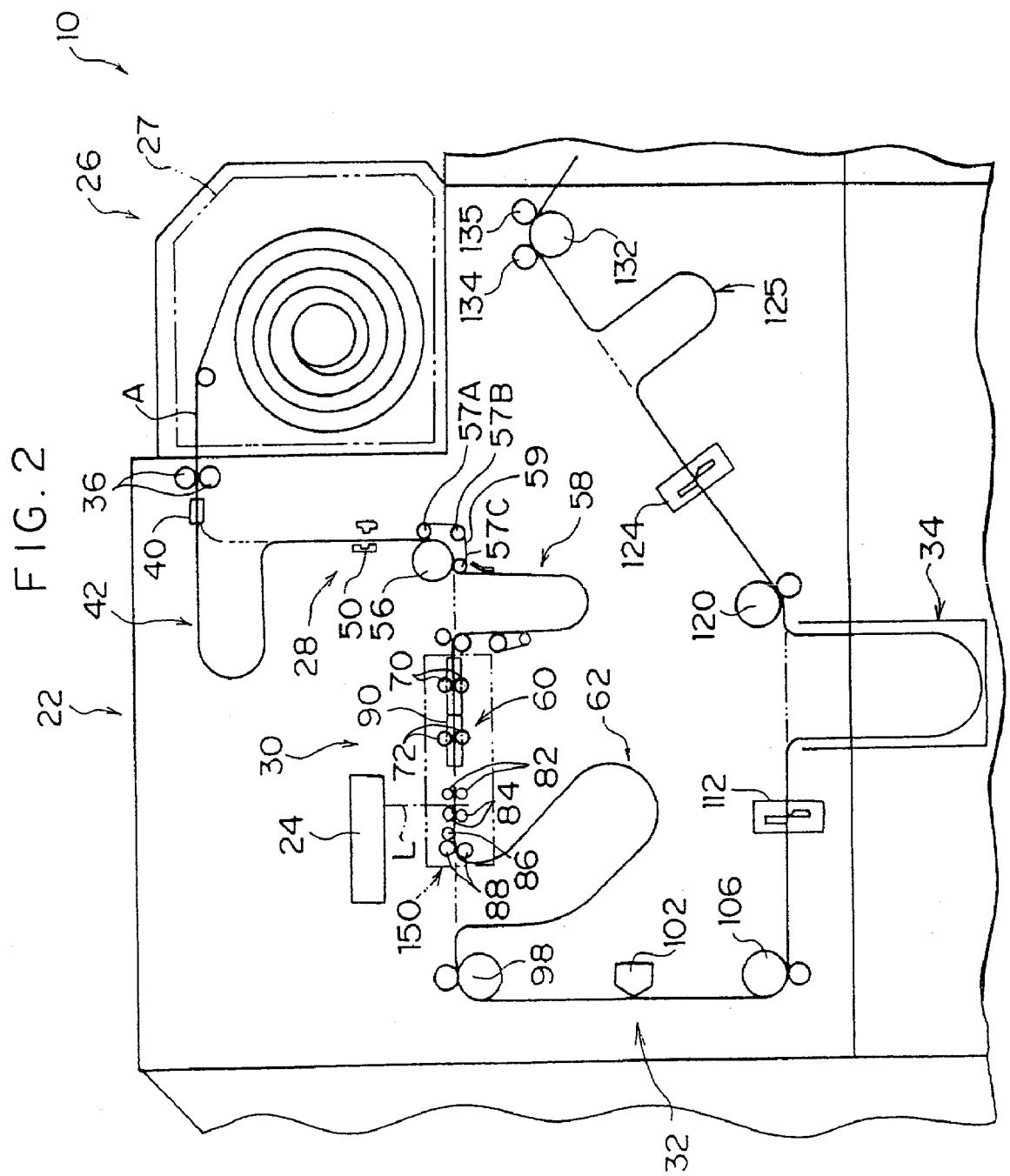
FIG. 2 is a schematic side view of a printing/conveyance device disposed in the image recording device relating to the present invention.

An image recording device 10 shown in FIGS. 1 and 2 is used mainly in a digital photoprinter. In the image recording device 10, an image recorded on a film is read by an image reading device such as a film scanner. Based on exposure conditions (image recording conditions) determined in a set up device in accordance with the read image, an image recording material (photosensitive material) is scan-exposed with a light beam to form a latent image. The latent image thus formed is then developed and processed, and a print corresponding to the image recorded on the film is outputted. The image recording device 10 basically comprises an image recording section 12, a development section 14, a drying section 16, a discharge section 18 and an electric equipment section 20 in which a control circuit board and a power supply are accommodated.

The image recording section 12 is disposed with a printing/conveyance device 22 and a light beam scanning device 25. The image recording section 12 pulls out a photosensitive material A wound in a roll in a photosensitive material magazine 27, conveys the same on a predetermined path, records image position information. The photosensitive material A is imagewisely exposed (printing), back prints are formed on the backside of the photosensitive material A. The photosensitive material A is then conveyed to the development section 14. The image recording section 12 has a photosensitive material supplying section 27, and image position information creating section 29, an exposure section 30, a back print section 32, a reservoir 34 and a conveyance device for conveying the photosensitive material A on the predetermined path passing through each section.

The photosensitive material magazine 27, wherein the photosensitive material A wound in a roll is accommodated in a light-shielding housing, is loaded into the photosensitive material supplying section 26. The photosensitive material supplying section 26 is disposed on the printing/conveyance device 22 and at a side of an exposure device formed by the exposure section 30 and the light beam scanning device 24.

A pair of pull-out rollers 36 for pulling out the photosensitive material A from the photosensitive material magazine 27, a width guide member 40 for restricting a widthwise direction of the photosensitive material A and a first loop-forming section 42 where a loop of the photosensitive material A is formed in a U-shape are disposed in a vicinity of the photosensitive material magazine 27.

The pull-out roller pair 36 can nip and release the photosensitive material A by an unillustrated nip-release mechanism. The width guide member 40 adjusts a guide width based on a size (width) of the photosensitive material A by an unillustrated guide width adjusting mechanism.

At the first loop-forming section 42, by forming a loop (slack) of the photosensitive material A, variation in movement of the photosensitive material A due to the photosensitive material A being conveyed or stopped at the image position information creating section 28 disposed downstream from the first loop-forming section 42 is absorbed.

The image position information creating section 28 is provided downstream from the first loop-forming section 42 and has a punch 50 for punching holes in the photosensitive material A. The image position information creating section 28 creates the image position information on the photosensitive material A, such as positional information (so-called frame information) per print or positional information (so-called sort information) per set unit number of prints, e.g., one 24-exposure photographic film or one 36-exposure photographic film.

The image position information is detected by a hole sensor 160. After the photosensitive material A is exposed in the exposure section 30 by image data corresponding to the image position, necessary data is recorded in the photosensitive material A in the back print section 32.

The exposure section 30 is disposed downstream from the image position information creating section 28, with a conveying roller 56 and an endless belt 59 entrained about rollers 57A to 57C being disposed between the image position information creating section 28 and the exposure section 30. The exposure section 30 includes a second loop-forming section 58, a sub-scanning/conveyance section 60 and a third loop-forming section 62. The photosensitive material A, having a loop formed by a second loop-forming section 58, is guided to the sub-scanning/conveyance section 60.

The sub-scanning/conveyance section 60 is disposed with a sub-scanning/conveyance device 150. The sub-scanning/conveyance device 150 includes guide members 90, 92 (see FIG. 3) for guiding the photosensitive material A to an exposure position, registration rollers 70, 72 and conveying rollers 82, 84 downstream from the registration rollers 70, 72 for precisely conveying the photosensitive material A to the exposure position.

The light beam scanning device 24 scan-exposes the photosensitive material A in a main scanning direction while the photosensitive material A is conveyed in a sub-scanning direction by the conveying rollers 82, 84, so as to two-dimensionally expose the photosensitive material A. Rollers 86 and a pair of rollers 88 are disposed downstream from the conveying rollers 82, 84, and the exposed photosensitive material A is guided to a third loop-forming section 62.

The second loop-forming section 58 that is disposed upstream from the sub-scanning/conveyance section 60 and the third loop-forming section 62 that is disposed downstream from the sub-scanning conveyance section 60 eliminate adverse effects such as so-called back tension and tension caused by the upstream and downstream conveyance devices when the photosensitive material A is sub-scanned/conveyed in the sub-scanning/conveyance section 60, whereby the photosensitive material A is sub-scanned/conveyed with high precision.

The back print section 32 is disposed downstream from the third loop-forming section 62, with a conveying roller 98 being disposed between the third loop-forming section 62 and the back print section 32. At the back print section 32, various data, such as dates photographs represented by images on an original film were taken and dates images were recorded on the photosensitive material A, is recorded on a back surface of the photosensitive material A by a printer 102.

A first cutter 112 and a reservoir (fourth loop-forming section) 34 are disposed downstream from the back print section 32, with a conveying roller 106 being disposed between the back print section 32 and the first cutter 112. The first cutter 112 is not used in an ordinary operational state, and cuts the photosensitive material A when all of the exposed photosensitive material A accommodated in the reservoir 34 is discharged after being exposed.

A second cutter 124 and a fifth loop-forming section 125 are disposed downstream from the reservoir 34, with a conveying roller 120 being disposed between the reservoir 34 and the second cutter 124. The second cutter 124 is used for cutting the photosensitive material A when any troubles occur. For example, when an amount of the photosensitive material A accommodated in the reservoir 34 is equal to or less than a predetermined amount, or when any troubles occur at the development section 14, the second cutter 124 cuts the photosensitive material A. Consequently, it is possible to avoid adverse effects on the exposed photosensitive material A accommodated in the reservoir 34 or damage to the conveying devices, including the printing/conveyance device 22, caused by the photosensitive material A being pulled excessively toward the development section 14.

The fifth loop-forming section 125 finally absorbs a difference between a processing speed of the printing/conveyance device 22 and a processing speed of the development section 14, and variation in movement of the photosensitive material A due to conveyance or stop of conveyance of the photosensitive material A by a conveying device 118 so as to prevent the photosensitive material A from being pulled excessively by the development section 14 and damaged.

A conveying roller 132 and nip rollers 134, 135 are disposed downstream from the fifth loop-forming section 125, and the photosensitive material A is conveyed to the development section 14. The photosensitive material A which reaches the development section 14 passes through a development tank 136, a fixing tank 138 and washing tanks 140 and is conveyed to the drying section 16. Then, the photosensitive material A is cut at predetermined lengths by a cutter 148 in the discharge section 18 to form finished prints. Then, the finished prints are accommodated in a sorter 144.

Next, the sub-scanning/conveyance device 150 disposed in the image recording device 10 according to an embodiment of the present invention will be described.

Sub-Scanning/Conveyance Device

Figure 3:
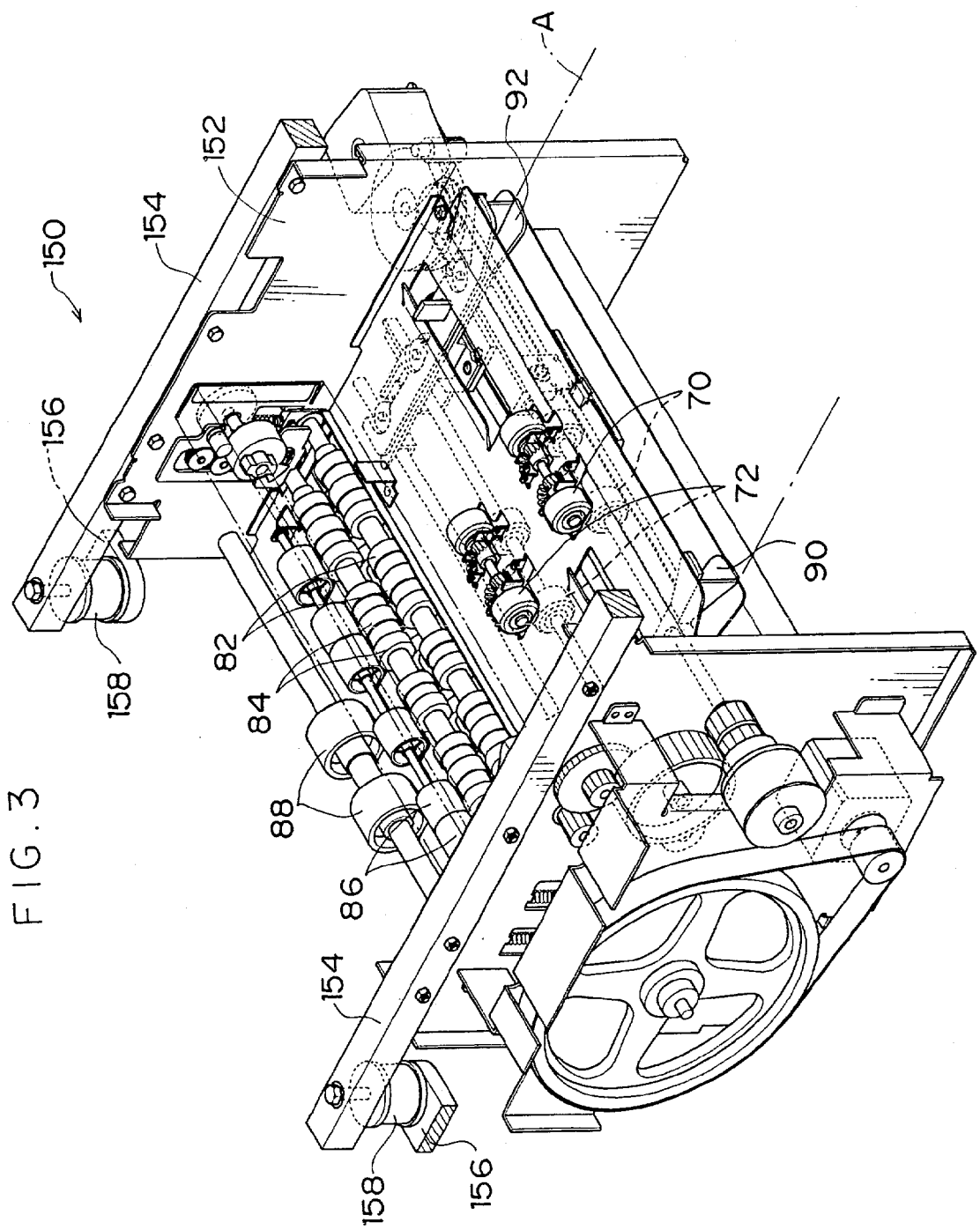
FIG. 3 is a perspective view of a sub-scanning/conveyance device disposed in the printing/conveyance device of the image recording device relating to the present invention.
Figure 4:
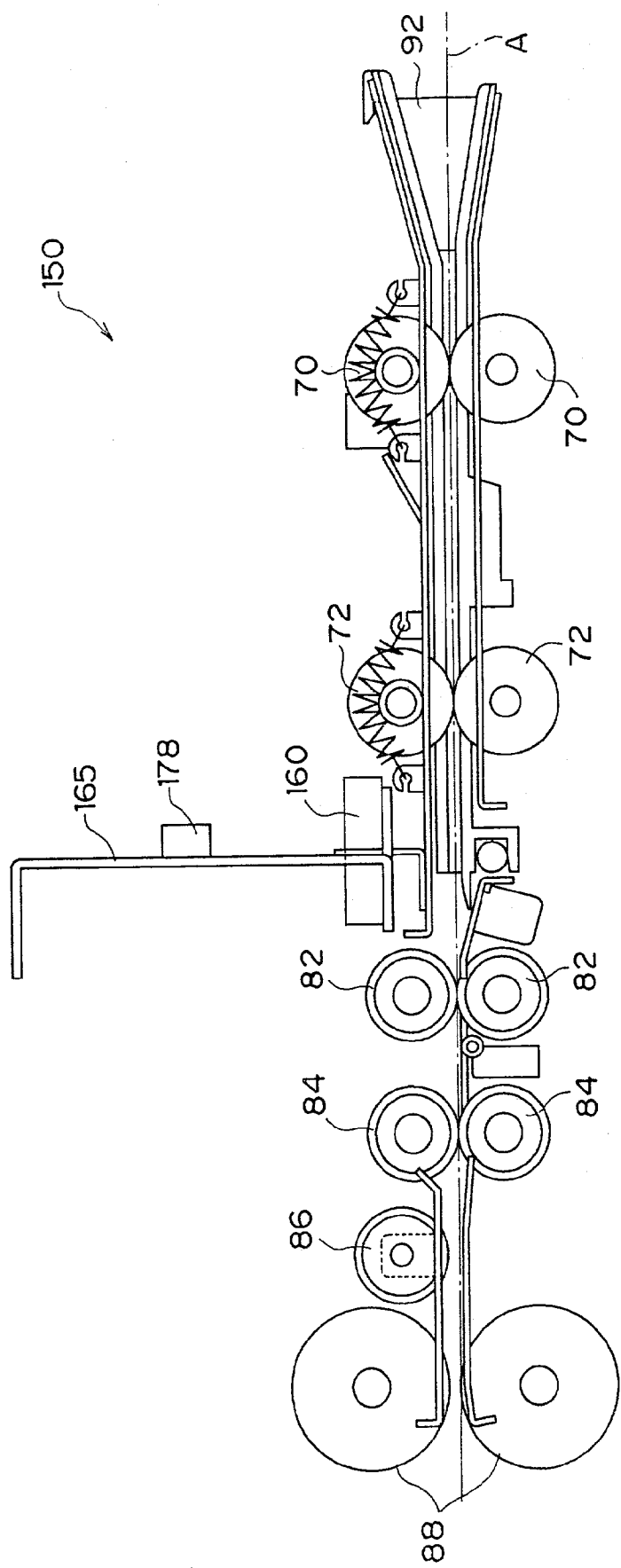
FIG. 4 is a schematic side view of the sub-scanning/conveyance device disposed in the printing/conveyance device of the image recording device relating to the present invention.

As shown in FIGS. 3 and 4, the guide members 90 and 92 and the registration roller pairs 70 and 72 are disposed upstream from the sub-scanning/conveyance device 150. The photosensitive material A conveyed from the second loop-forming section 58 (see FIG. 2) is received by the guide members 90 and 92, and the guide members 90 and 92 support widthwise direction edges of the photosensitive material A and guide the photosensitive material A toward the downstream side of the sub-scanning/conveyance device 150.

The registration roller pairs 70 and 72 are slightly inclined relative to the widthwise direction of the photosensitive material A that is conveyed, and guide the photosensitive material A toward the downstream side of the sub-scanning/conveyance device 150 while the side edge of the photosensitive material A is being aligned with the guide member 90 or 92 so that the photosensitive material A is positioned in the widthwise direction.

The conveying roller pairs 82 and 84 are disposed downstream from the registration roller pair 72. The photosensitive material A is exposed with light between the conveying roller pair 82 and the conveying roller pair 84 to form an image. At this time, the photosensitive material A is nipped by the conveying roller pairs 82 and 84, and a latent image is formed on the photosensitive material A at an accurate position thereof.

As shown in FIG. 4, a mounting plate 165 is fixed between the registration roller pair 72 and the conveying roller pair 82, and the hole sensor 160 is mounted on the mounting plate 165.

The hole sensor 160 detects the punch holes formed in the image position information creating section 28 (see FIG. 2) disposed downstream from the first loop-forming section 42 (see FIG. 2) to determine the position of an image to be written on the photosensitive material A. The photosensitive material A is exposed with light by the light beam scanning device 24 (see FIG. 2) in accordance with image data which is outputted at a predetermined timing so as to correspond to the image frame number.

The photosensitive material A with a latent image formed thereon is guided to the third loop-forming section 62 (see FIG. 2). The photosensitive material A is guided smoothly to the third loop-forming section 62 by a roller pair 88 disposed downstream from the conveying roller pair 84.

As shown in FIG. 3, in the sub-scanning/conveyance device 150, a bracket 154 is fixed to each upper portion of the side plates 152, with the conveyed photosensitive material A being disposed between the side plates 152. The brackets 154 can be mounted to stands 156 provided within the printing/conveyance device 22 (FIG. 2).

Each of vibration isolating devices, such as vibration isolating rubbers 158, is disposed between the bracket 154 and the stand 156. Vibration (hereinafter referred to as "internal vibration") caused by other driving devices disposed within the printing/conveyance device 22 can be eliminated by the vibration isolating rubbers 158, and the vibration isolating rubbers 158 prevent the internal vibration from being transmitted to the sub-scanning/conveyance device 150.

Accordingly, image unevenness occurring during exposure is eliminated such that a highly precise image can be formed. However, if vibration (hereinafter referred to as "externally-induced vibration") caused by an impact from outside exceeds a permissible range, the externally-induced vibration adversely affects the sub-scanning/conveyance device 150. Further, image unevenness of the latent image formed on the photosensitive material A may occur during the externally-induced vibration.

Thus, as shown in FIG. 4, an acceleration pickup 178 serving as a vibration measuring device is mounted to the mounting plate 165, and acceleration is measured in X, Y and Z axial directions of the sub-scanning/conveyance device 150. The acceleration pickup 178 is connected to a control section 162 (see FIG. 5), and numerical data of the acceleration pickup 178 serving as an acceleration detector are transmitted to the control section 162. An acceleration pickup which uses piezoelectric ceramics may be used as the acceleration pickup 178. If acceleration is applied to the piezoelectric ceramics, voltage that is proportional to the applied acceleration is outputted. Thus, an acceleration value can be computed from the voltage.

Figure 5:
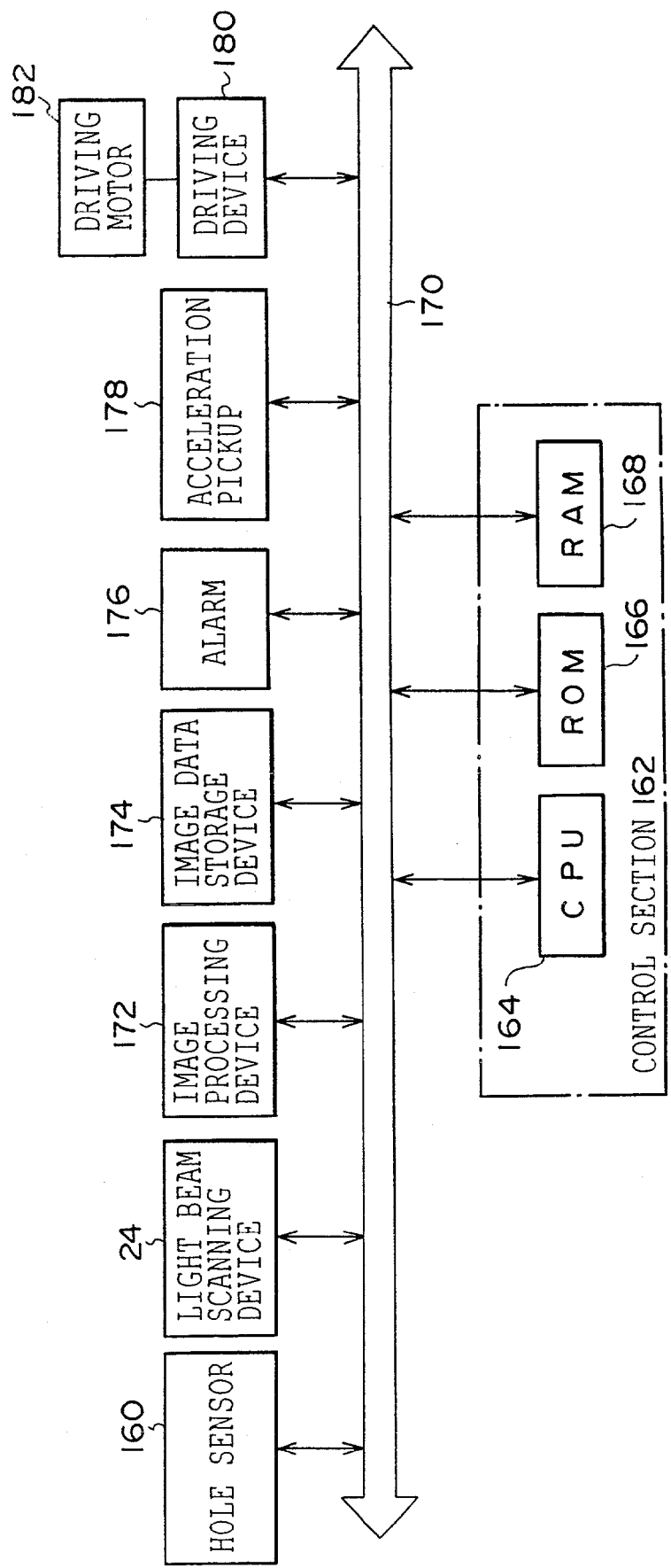
FIG. 5 is a block diagram of main portions of the image recording device relating to the present invention.

FIG. 5 shows a block diagram of main portions of the image recording device according to the present embodiment. The control section 162 is composed of a CPU 164, a ROM 166 and a RAM 168. Various components are connected to the control section 162 via a bus 170, such as the hole sensor 160, the light beam scanning device 24, an image processing device 172, an image data storage device 174, an alarm 176, the acceleration pickup 178 and a driving device 180.

The ROM 166 stores programs for controlling the above-mentioned various components connected to the control section 162 and a program for controlling drive of the driving device 180. The RAM 168 stores temporarily various data which are inputted via the bus 170 and are necessary for the aforementioned programs.

A driving motor 182 for conveying the photosensitive material A is connected to the driving device 180 connected to the control section 162 via the bus 170 and is drive-controlled based on a control signal from the control section 162.

By the above-described configuration, the CPU 164 reads the various control programs and the drive control program from the ROM 166 and performs an initial setting processing for various components.

An acceleration signal measured by the acceleration pickup 178 is inputted to the control section 162. If acceleration of a predetermined value or greater is detected (i.e., if vibration of a predetermined value or greater occurs), the alarm 176 is turned on via the bus 170 and the image frame number exposed at that time is signaled.

If acceleration of the predetermined value or greater is detected by the acceleration pickup 178, image data of the aforementioned image number is inputted from the image processing device 172 via the bus 170 to the image data storage device 174 and stored therein. After predetermined exposures have been finished, the stored image data is transmitted from the image storage device 174 to the light beam scanning device 24, and re-exposure using the image data can be performed.

As described above, since the image frame number of the photosensitive material A exposed when vibration of the predetermined value or greater has occurred is signaled by the alarm 176, an operator does not need to select inferior prints from finished prints.

If acceleration of the predetermined value or greater continues for a predetermined period of time (a few seconds), a control signal is outputted from the control section 162 via the bus 170 to the driving device 180 to stop the driving motor 182 and the image processing device 172.

In the event that the vibration is continuous, such as in an earthquake, all images of image frames exposed during the vibration may be unsatisfactory. Thus, the driving motor 182 and the image processing device 172 are stopped to avoid wasting of the photosensitive material A.

Figure 6A:
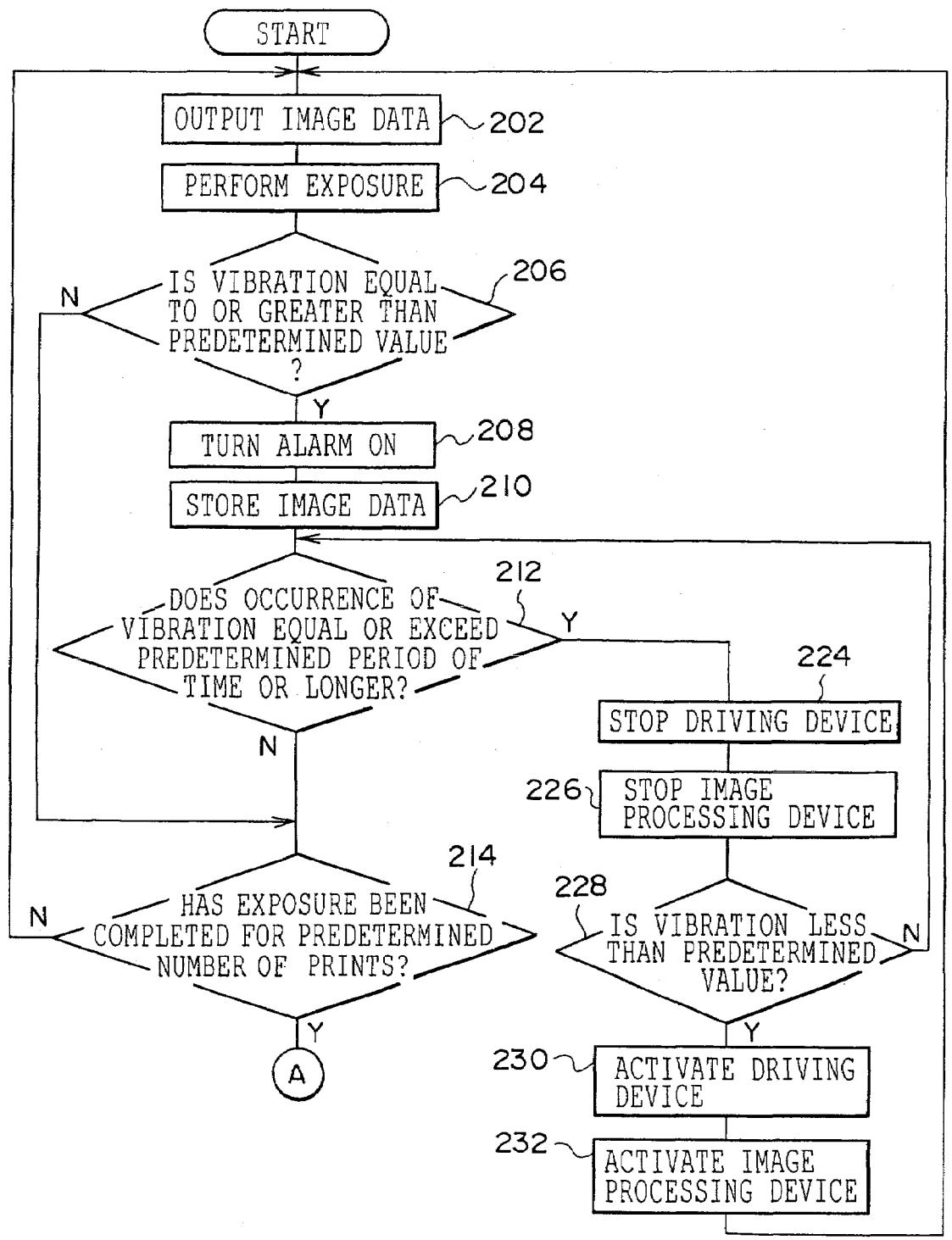
FIGS. 6A and 6B are a flow chart showing a job in a control section which controls the sub-scanning/conveyance device disposed in the printing/conveyance device of the image recording device relating to the present invention.
Figure 6B:
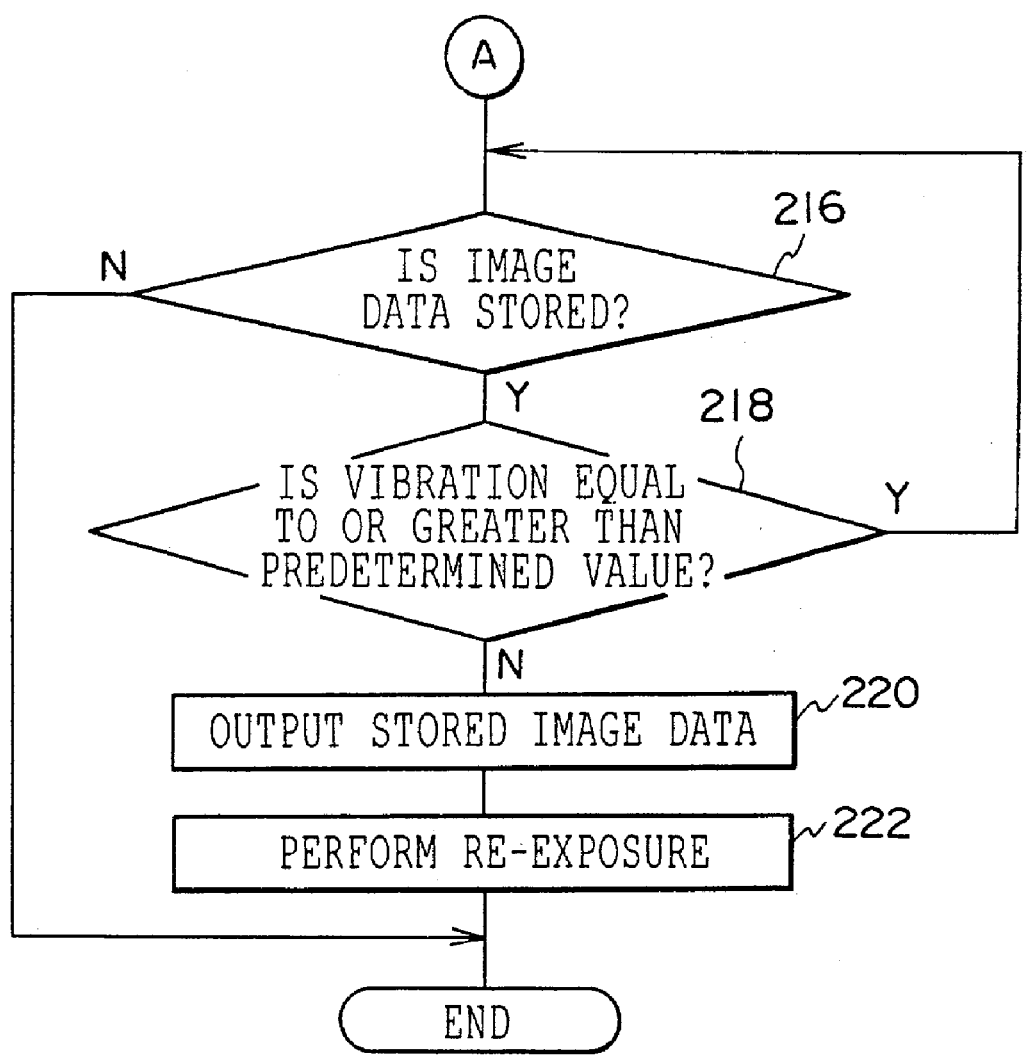

Next, a job in the control section 162 will be described with reference to FIG. 5 and a flow chart shown in FIGS. 6A and 6B.

In step 202, image data of an image frame number is outputted from the image processing device 172. In step 204, a photosensitive material A is exposed with light by the light beam scanning device 24, whereby a latent image corresponding to the image data of the image frame number is formed.

In step 206, it is determined whether or not vibration occurring when an image is exposed using the image data of the image frame number is equal to or greater than the predetermined value on the basis of acceleration received the acceleration pickup 178. If the vibration is equal to or greater than the predetermined value, in step 208, the alarm 176 is turned on to signal the frame number of the image exposed when vibration of the predetermined value or greater occurred. In step 210, the image data of the corresponding image frame number is stored in the image data storage device 174.

In step 212, it is determined whether or not the vibration of the predetermined value or greater has continued for a predetermined period of time or longer. If the vibration has not continued for the predetermined period of time or longer, i.e., if the vibration was momentary, in step 214, it is determined whether or not exposure has been completed for a predetermined number of prints.

If exposure has not been completed for the predetermined number of prints, the process returns to step 202, and the above-described job is performed for the image of the next image frame number. On the other hand, if the exposure has been completed for the predetermined number of prints, it is determined in step 216 whether or not the image data is stored in the image data storage device 174.

If the image data is not present in the image data storage device 174, the job ends. However, if the image data is present, it is determined in step 218 whether or not the vibration is equal to or greater than the predetermined value is determined before exposure. If the vibration is equal to or greater than the predetermined value, the determination is repeated until the vibration becomes smaller than the predetermined value.

If the vibration is smaller than the predetermined value, in step 220, the stored image data (i.e., the image data of the unsatisfactory image frame number) is outputted to the light beam scanning device 24. In step 222, the photosensitive material A is re-exposed by using the image data(the processing is carried out by a so-called interruption routine).

If the vibration of the predetermined value or greater continues for a predetermined period of time or longer, in step 224, drive of the driving device 180 stops and conveyance of the photosensitive material A also stops. In step 226, outputting of the image data by the image processing device 172 stops. Because the photosensitive material A is not exposed with light while the vibration having the predetermined value or greater occurs, the number of unsatisfactory image frames can be minimized and waste of the photosensitive material A can be avoided.

Then, in step 228, it is determined whether or not the vibration is smaller than the predetermined value. If the vibration is smaller than the predetermined value, the driving device 180 is actuated in step 230 and the image processing device 172 is actuated in step 232. Then, the process returns to step 202 and the above-described job is performed for the image of the next image frame number.

If the printing/conveyance device 22 (see FIG. 2) is impacted by an object hitting the printing/conveyance device 22, only the images of the image frames exposed at the time of the impact become unsatisfactory because the vibration is momentary. As image unevenness is not generated in images of image frames other than the unsatisfactory image frames, the driving motor 182 does not stop and the photosensitive material A continues to be exposed.

Therefore, if vibration of the predetermined value or greater occurs, images of image frames formed during the vibration are re-exposed after a predetermined number of prints has been exposed and prior to exposure of the next photographic film. However, the interruption timing is not limited as long as the unsatisfactory images can be restored. Thus, the interruption may be performed at any timing.

As it is highly possible that the image frames formed during the vibration having a predetermined value or greater become unsatisfactory, images of such image frames must be re-exposed. However, if after checking the same it is discovered that there are no problems, re-exposure becomes unnecessary. Accordingly, whether or not images are to be re-exposed is arbitrary.

In the present invention, the acceleration pickup that measures acceleration in X, Y and Z axial directions of the sub-scanning/conveyance device 150 is used as the acceleration pickup 178. However, an acceleration pickup that measures acceleration only in one axial direction may be used.

When using an acceleration pickup that measures acceleration only in one axial direction, a Z axial direction vibration of the sub-scanning/conveyance device 150 is eliminated to a certain extent in the second and the third loop-forming sections 58 and 62 by vibration isolating rubbers 158. Accordingly, the acceleration pickup 178 may be disposed only on the X or Y axis. The acceleration pickup is not limited as long as vibration of the sub-scanning/conveyance device 150 can be measured.

If the vibration having a predetermined value or greater occurs, the number of the image frame of the photosensitive material A exposed when the vibration having a predetermine value or greater occurred is informed by the alarm. However, the present invention is not limited to the above-described system as long as the number of the image frame of the photosensitive material A exposed during the vibration is informed. Thus, the image frame number may be displayed on a display portion of the image recording device 10.

In accordance with the present invention, the number of the image frame of the photosensitive material A exposed when the vibration having a predetermined value or greater occurred is informed to the exterior of the recording device by using an alarm or a display and then image unevenness is confirmed only for the image frame number. Thus, check operation becomes easy.

Image data of the frame number having unsatisfactory image quality is stored in a storage device and the image data is retrieved from the storage device when re-exposing the same. Thus, an operator's work load can be reduced.

In accordance with the present invention, if an exposure device and its vicinity vibrate at a predetermined value or greater, image quality corresponding to the image frame formed during the vibration becomes unsatisfactory. Thus, if the vibration continues, conveyance of an image recording material stops, thereby preventing waste of the image recording material.

What is claimed is:

1. An image recording device comprising:
    an exposure mechanism for exposing an image recording material at an exposure section to form a latent image on said image recording material;
    a vibration measuring device, disposed in a vicinity of said exposure mechanism, for measuring vibration of said exposure section;
    an information device for notifying an operator of an image frame number of said image recording material exposed during the vibration when a value measured by said vibration measuring device is equal to or greater than a predetermined value; and
    a storage device for storing image data of an image frame number of said image recording material exposed by said exposure mechanism when a value measured by said vibration measuring device is equal to or greater than a predetermined value.

2. An image recording device comprising:
    an exposure mechanism for exposing an image recording material at an exposure section to form a latent image on said image recording material;
    a vibration measuring device, disposed in a vicinity of said exposure mechanism, for measuring vibration of said exposure section; and an information device for notifying an operator of an image frame number of said image recording material exposed during the vibration when a value measured by said vibration measuring device is equal to or greater than a predetermined value, wherein said vibration measuring device is an acceleration detector which measures acceleration in at least one of a direction in which said image recording material is conveyed, a direction orthogonal to the direction in which said image recording material is conveyed and a direction vertical to the surface of the image recording material.

3. The image recording device according to claim 2, wherein when the value measured by said vibration measuring device is equal to or greater than a predetermined value for a predetermined period of time or longer, conveyance of said image recording material is stopped.

4. The image recording device according to claim 3, wherein said vibration measuring device is connected to an image recording material conveying device in said exposure mechanism.

5. An image recording device comprising:
an exposure mechanism for exposing an image recording material at an exposure section to form a latent image on said image recording material;
a vibration measuring device, disposed in a vicinity of said exposure mechanism, for measuring vibration of said exposure section; and
an information device for notifying an operator of an image frame number of said image recording material exposed during the vibration when a value measured by said vibration measuring device is equal to or greater than a predetermined value, wherein
when the value measured by said vibration measuring device is equal to or greater than a predetermined value for a predetermined period of time or longer, conveyance of said image recording material is stopped.

6. An image recording device comprising:
an exposure mechanism for main-scanning an image recording material, which is conveyed in a sub-scanning direction, by light beams, which are modulated on the basis of image data, to form a latent image on said image recording material;
a vibration measuring device, disposed in a vicinity of said exposure mechanism, for measuring vibration of an exposure section;
an information device for notifying an operator of an image frame number of said image recording material exposed during the vibration when a value measured by said vibration measuring device is equal to or greater than a predetermined value; and
a storage device for storing image data of an image frame number of said image recording material exposed by said exposure mechanism when a value measured by said vibration measuring device is equal to or greater than a predetermined value.

7. An image recording device comprising:
an exposure mechanism for main-scanning an image recording material, which is conveyed in a sub-scanning direction, by light beams, which are modulated on the basis of image data, to form a latent image on said image recording material;
a vibration measuring device, disposed in a vicinity of said exposure mechanism, for measuring vibration of an exposure section; and
an information device for notifying an operator of an image frame number of said image recording material exposed during the vibration when a value measured by said vibration measuring device is equal to or greater than a predetermined value, wherein said vibration measuring device is an acceleration detector which measures acceleration in at least one direction of a direction in which said image recording material is conveyed, a direction orthogonal to the direction in which said image recording material is conveyed and a direction vertical to the surface of the image recording material.

8. The image recording device according to claim 7, wherein when the value measured by said vibration measuring device is equal to or greater than a predetermined value for a predetermined period of time or longer, conveyance of said image recording material is stopped.

9. The image recording device according to claim 8, wherein said vibration measuring device is connected to an image recording material conveying device in said exposure mechanism.

10. An image recording device comprising:
an exposure mechanism for main-scanning an image recording material, which is conveyed in a sub-scanning direction, by light beams, which are modulated on the basis of image data, to form a latent image on said image recording material;
a vibration measuring device, disposed in a vicinity of said exposure mechanism, for measuring vibration of an exposure section; and
an information device for notifying an operator of an image frame number of said image recording material exposed during the vibration when a value measured by said vibration measuring device is equal to or greater than a predetermined value, wherein
when the value measured by said vibration measuring device is equal to or greater than a predetermined value for a predetermined period of time or longer, conveyance of said image recording material is stopped.

11. An image recording device comprising:
an exposure mechanism for exposing an image recording material at an exposure section to form a latent image on said image recording material;
a vibration measuring device, disposed in a vicinity of said exposure mechanism, for measuring vibration of said exposure section;
a storage device for storing image data of an image frame number of said image recording material exposed by said exposure mechanism when a value measured by said vibration measuring device is equal to or greater than a predetermined value; and
a control device for controlling said exposure mechanism to expose said image recording material by using the image data stored in said storage device to form a latent image of said image data on said image recording material.

12. The image recording device according to claim 11, wherein said vibration measuring device is an acceleration detector which measures acceleration in at least one of a direction in which said image recording material is conveyed, a direction orthogonal to the direction in which said photosensitive material is conveyed and a direction vertical to the surface of the image recording material.

13. The image recording device according to claim 11, wherein when the value measured by said vibration measuring device is equal to or greater than a predetermined value for a predetermined period of time or longer, conveyance of said image recording material is stopped.

14. The image recording device according to claim 12, wherein when the value measured by said vibration measuring device is equal to or greater than a predetermined value for a predetermined period of time or longer, conveyance of said image recording material is stopped.

15. The image recording device according to claim 14, wherein said vibration measuring device is connected to an image recording material conveying device in said exposure mechanism.

16. A method for recording an image, the method comprising:

exposing an image recording material at an exposure section to form a latent image on said image recording material;

measuring a vibration value of the exposure section;

storing image data of an image frame number the vibration value measured is equal to or greater than a predetermined value; and re-exposing the image recording material using the stored image data.

17. The image recording method of claim 16, wherein the measuring a vibration value comprises measuring acceleration in at least one of a direction in which said image recording material is conveyed, a direction orthogonal to the direction in which said image recording material is conveyed and a direction vertical to the surface of the image recording material.

* * * * *